Nov. 6, 1923.  L. B. KNIGHT  1,473,297

SEED DRILL

Filed May 16, 1921

INVENTOR
Lionel Barrington Knight

By his ATTORNEY.

Patented Nov. 6, 1923.

1,473,297

UNITED STATES PATENT OFFICE.

LIONEL BARRINGTON KNIGHT, OF PORT PIRIE, SOUTH AUSTRALIA, AUSTRALIA.

SEED DRILL.

Application filed May 16, 1921. Serial No. 469,784.

*To all whom it may concern:*

Be it known that LIONEL BARRINGTON KNIGHT, a subject of His Majesty the King of Great Britain, residing at Norman Street, Port Pirie, in the State of South Australia and Commonwealth of Australia, has invented certain new and useful Improvements in Seed Drills, of which the following is a specification.

My invention relates to improvements in seed drills the object of the same being to provide means whereby the seed can be planted to better advantage than is at present the case with drills manufactured according to usual custom.

As the result of close observation I have found that the percentage of malted grain resulting from ordinary seed drill planting is relatively high, particularly in dry seasons and I find by experiment that this result is almost invariably brought about if the grain is very closely associated and in direct contact with phosphate fertilizer and certain other classes of chemical manure. For this reason I have devised means whereby the association of the grain and the fertilizer may be less intimate without lessening the value of the fertilizer for stimulating growth.

In order to achieve this object I construct my machine with two drills or with a double drill instead of the single tube device as at present used. With my drills the double device is so arranged that the drill for carrying fertilizer is placed a little in advance of the portion which carries the seed, and penetrates the earth to a slightly greater depth than the seed carrier. Immediately rearward of the fertilizer drill I mount a spreader plate which may be of any suitable design for covering the fertilizer material with a layer of earth, such spreader plate being preferably rendered easy of adjustment, and behind the spreader plate I arrange the device for distributing the grain in connection with planting.

This drill penetrates a portion of the earth which covers the fertilizing material but does not extend as deeply into the ground as the fertilizer drill and therefore deposits the grain above the fertilizer but not in immediate contact therewith.

Provision is made for properly directing and regulating the supply of fertilizer and the supply of grain or seed wheat for which purpose devices similar to those which are at present in use may be employed.

But in order that my invention may be clearly understood I will now describe the same by aid of the accompanying illustrative drawings wherein—

Fig. 1 is an external side elevation of the drill.

Fig. 2 side elevation of drill in part section.

In each of the illustrations similar letters of reference are used to denote similar or corresponding parts wherever they occur.

Figure 1:
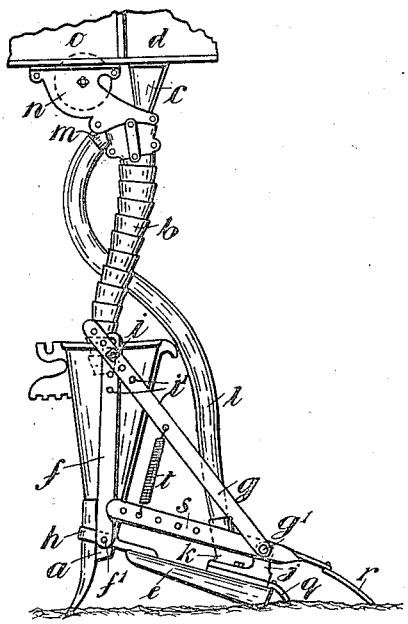
Figure 2:
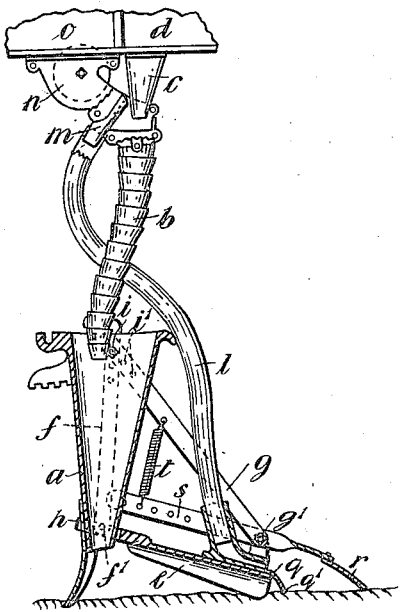
Figure 3:
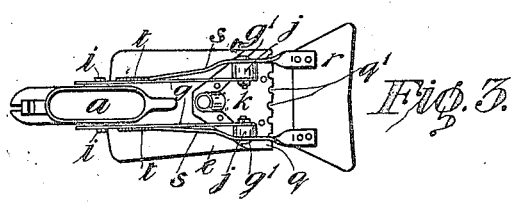
Fig. 3 is a plan of Fig. 1 with the upper parts removed.
Figure 4:
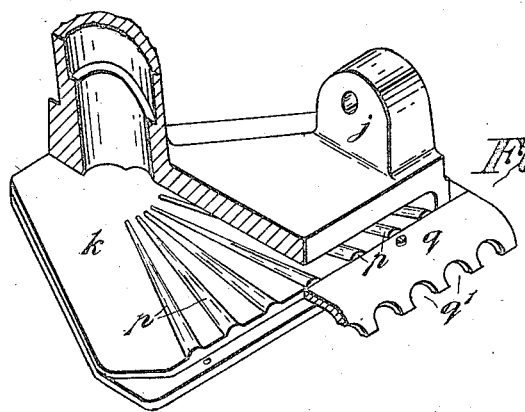
Fig. 4 is a detail of the distributor in part section on enlarged scale.

In the drawings the fertilizer drill is shown at $a$ and may be of the ordinary hoe or other suitable type and fertilizer is conveyed thereto through a flexible tube $b$ from a funnel $c$ that is attached to the fertilizer box $d$.

At the rear of the drill $a$ is a spreader $e$ that is adapted to cover the fertilizer with a layer of earth. This spreader $e$ is adjustably supported by means of two pairs of rods $f$ and $g$.

Each rod $f$ is connected at its lower end by a bolt $f'$ to a loop $h$, integral with the spreader plate $e$, and at its upper end by a bolt $i$ to the drill $a$. Each rod $g$ is connected at its lower end by bolts $g'$ to a lug $j$ near the rear of the spreader plate $e$, its upper end being secured by the bolt $i$. Each of the rods $f$ and $g$ has a plurality of holes $i'$ near its upper end so that it may be adjusted relatively to the bolt $i$ in order to adjust the angle or set of the spreader $e$.

Above the rear of the spreader $e$ is the seed distributor $k$ to which seed is directed through a flexible tube $l$ from a chute $m$ in the distributor $n$ of the seed box $o$.

The seed distributor $k$ has a plurality of ribs $p$ arranged fanwise and adapted to direct the grain to a drill plate $q$ the rear edge of which is toothed or serrated as at $q'$ to form furrows for the grain. Rearwardly of the plate $q$ is a tail $r$ that is adapted to place a layer of earth over the sown seed. This tail $r$ is supported on a pair of rods $s$ that are pivoted medially on the bolts $g'$ and at their forward ends are connected to the rods g, by springs t so that the tail r may rise and fall to adjust itself to the surface over which it is travelling.

In the drawings parts of the device are shown of somewhat heavy construction by the use of cast metal, but it is intended that pressed metal or light forgings should be used wherever suitable in order to reduce the weight of the device.

The operation of the invention may be briefly stated as follows:—

Fertilizer and seed are separately placed in their respective boxes and are fitted with and under the control of any suitable device. The fertilizer and the seed pass through their respective delivery apparatus whilst the drill is cutting its furrow. As the machine progresses the fertilizer is dropped into the ground through the drill a and covered with a layer of earth by means of the spreader e after which the edge q' of the plate q makes suitable grooves in the newly spread earth for the reception of the seed. Meanwhile the seed having passed through the flexible tube l is deposited on to the distributor k and from thence is allowed to fall on to the ground in a series of rows, it being separated and spread by the fanlike construction arranged upon the interior of the distributor. The seed having thus been deposited is finally covered with a layer of earth by means of the tail r.

In actual practice my distributor is capable of spreading the seed over an area at least four times greater than is covered with many drills at present in use.

Having now fully described and ascertained my said invention and the manner in which it is to be performed I declare that what I claim is:—

1. In a combined fertilizer and seed distributing machine, a fertilizer drill, a combined scraper and seed distributor mounted rearwardly of said fertilizer drill to cover the fertilizer with soil and deposit seed thereover, and a drill-plate at the rear of said seed distributor to form furrows into which the seed is discharged.

2. In a combined fertilizer and seed distributing machine, a fertilizer drill, and a member at the rear of said fertilizer drill, the under surface of said member serving as a scraper to cover the fertilizer with soil, the upper surface of said member having channels for distributing seed to the soil after the fertilizer has been covered.

3. In a combined fertilizer and seed distributing machine, a fertilizer drill, a member at the rear of said fertilizer drill, the under surface of said member serving as a scraper to cover the fertilizer with soil, the upper surface of said member having channels for distributing seed, and a drill-plate fixed to said member to the rear thereof to form furrows into which the seed is discharged.

4. In a combined fertilizer and seed distributing machine, a fertilizer drill for cutting furrows in the soil and depositing fertilizer therein, a member pivotally mounted at the rear of said drill, the under surface of said member serving as a scraper to cover the fertilizer with soil, the upper surface of said member having channels for distributing seed, a drill-plate fixed to said member to the rear thereof to form furrows into which the seed is discharged, said member being swingable to adjust the position of said drill-plate so that the furrows cut thereby are of less depth than the furrows cut by said fertilizer drill.

5. In a combined fertilizer and seed distributing machine, a fertilizer drill, a combined scraper and seed distributor mounted rearwardly of said fertilizer drill to cover the fertilizer with soil and deposit seed thereover, a drill-plate at the rear of said seed distributor to form furrows into which the seed is discharged, and a second scraper for covering the discharged seed with soil.

6. In a combined fertilizer and seed distributing machine, a fertilizer drill, a combined scraper and seed distributor mounted rearwardly of said fertilizer drill to cover the fertilizer with soil and deposit seed thereover, a drill-plate at the rear of said seed distributor to form furrows into which the seed is discharged, and a second scraper pivotally mounted on said combined scraper and seed distributor for covering the discharged seed with soil.

7. In a combined fertilizer and seed distributing machine, a fertilizer drill for cutting furrows in the soil and depositing fertilizer therein, a member pivotally mounted at the rear of said drill, the under surface of said member serving as a scraper to cover the fertilizer with soil, the upper surface of said member having channels for distributing seed, a drill-plate fixed to said member at the rear thereof to form furrows into which the seed is discharged, said member being swingable to adjust the position of said drill-plate so that the furrows cut thereby are of less depth than the furrows cut by said fertilizer drill, and a scraper mounted upon said member for covering the discharged seed with soil.

In testimony whereof he has affixed his signature.

LIONEL BARRINGTON KNIGHT.